United States Patent [19]

Fulop

[11] Patent Number: 5,791,845
[45] Date of Patent: Aug. 11, 1998

[54] SCREW ANCHOR FOR DRYWALL AND BLIND HOLES

[76] Inventor: Charles Fulop, 17664 Candlewood Ter., Boca Raton, Fla. 33487

[21] Appl. No.: 967,935

[22] Filed: Nov. 12, 1997

[51] Int. Cl.⁶ .......................... F16B 13/04; F16B 37/04
[52] U.S. Cl. ........................ 411/42; 411/61; 411/182; 411/908
[58] Field of Search .................. 411/42, 60, 61, 411/55, 182, 908

[56] References Cited

U.S. PATENT DOCUMENTS

| | | |
|---|---|---|
| 927,064 | 7/1909 | Mower . |
| 3,022,701 | 2/1962 | Potruch . |
| 3,175,455 | 3/1965 | Reddy . |
| 3,248,998 | 5/1966 | Siegel . |
| 3,318,183 | 5/1967 | Fischer . |
| 3,431,813 | 3/1969 | Johnson . |
| 3,524,379 | 8/1970 | Fischer . |
| 3,941,028 | 3/1976 | Lobello . |
| 4,416,048 | 11/1983 | Otte . |
| 4,602,902 | 7/1986 | Herb . |
| 4,610,587 | 9/1986 | Wollar . |
| 4,657,458 | 4/1987 | Woller et al. ............. 411/182 |
| 4,690,597 | 9/1987 | Liebig . |
| 4,692,076 | 9/1987 | Herb . |
| 4,729,704 | 3/1988 | Yokoyama ................ 411/61 |
| 4,921,381 | 5/1990 | Gschwend . |
| 4,948,314 | 8/1990 | Kurosaki ................. 411/182 |
| 5,219,452 | 6/1993 | Yamamoto ............. 411/61 X |

FOREIGN PATENT DOCUMENTS 276128  2/1990  Germany ................. 411/182

*Primary Examiner*—Neill R. Wilson
*Attorney, Agent, or Firm*—Alvin S. Blum

[57] ABSTRACT

A device for anchoring a threaded fastener in a drywall or blind hole is molded in one flat piece having two half cylinders joined by a thin frangible hinge. Each half-cylinder carries half of a threaded bore divided axially. When folded together the two half-cylinders form a cylindrical headed anchor with a continuously threaded passage extended part way to the hinge. A threaded fastener advances readily down the bore until the unthreaded portion is reached. The fastener, as it advances in that portion, forces the halves apart, rupturing the hinge and anchoring the device.

8 Claims, 2 Drawing Sheets

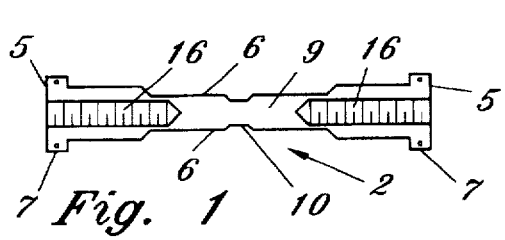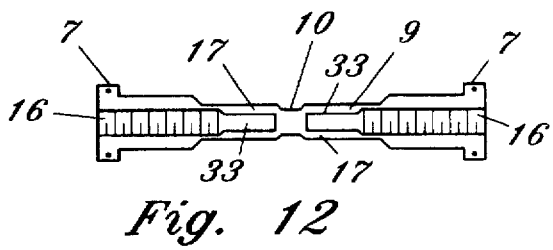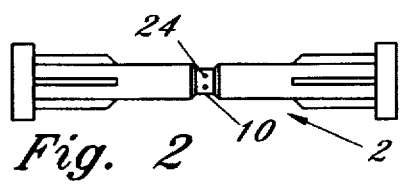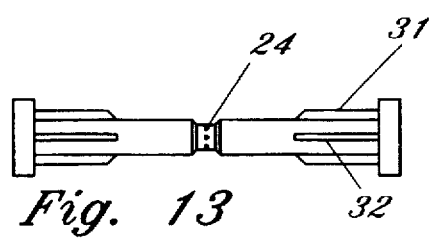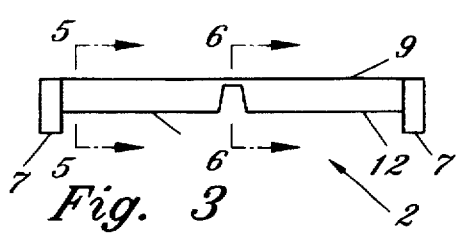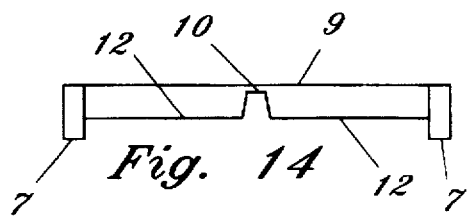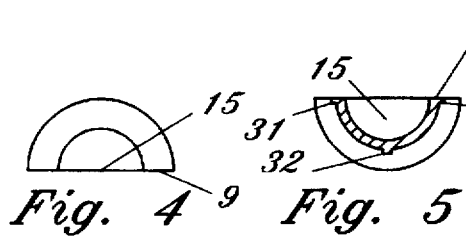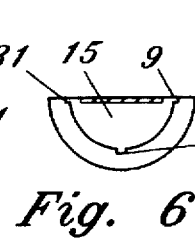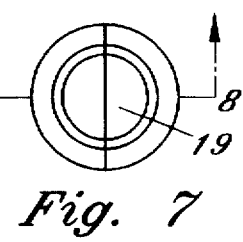

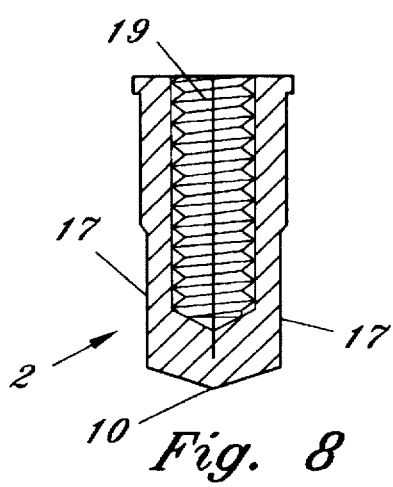
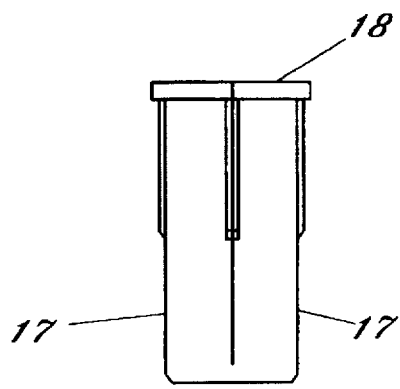
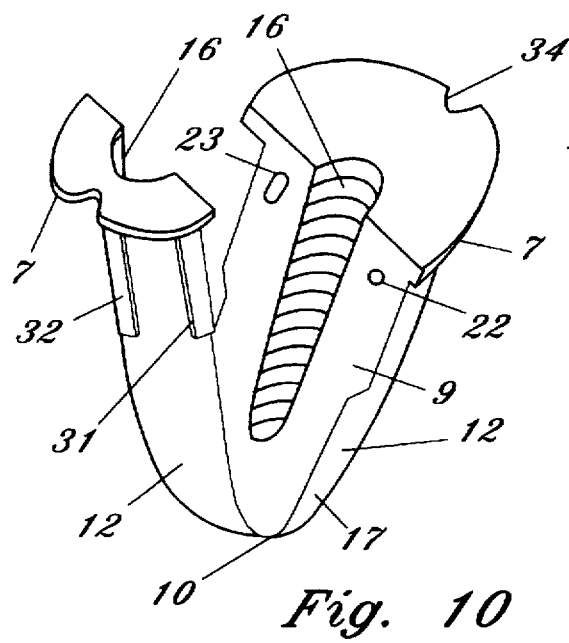
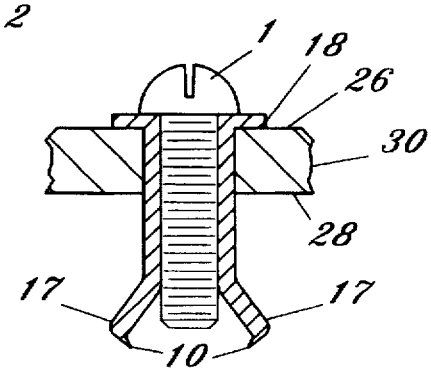
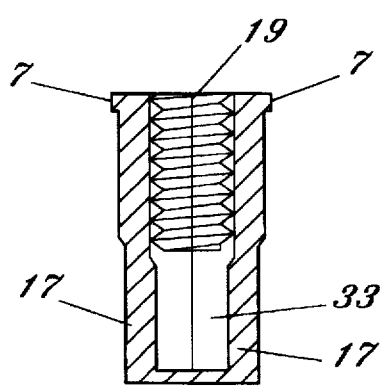
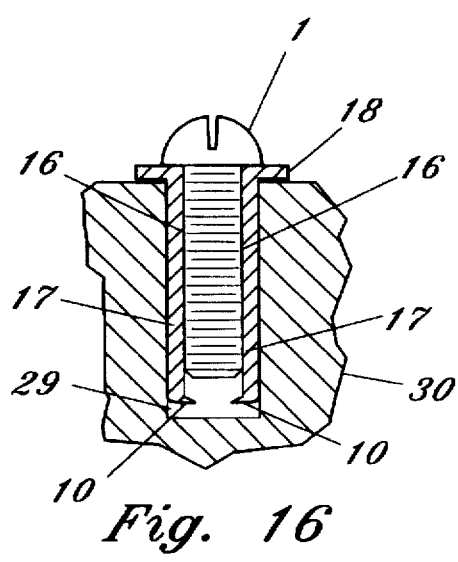

1

SCREW ANCHOR FOR DRYWALL AND BLIND HOLES

BACKGROUND OF THE INVENTION

1. Field of the Invention

This invention relates to one piece threaded expansion anchors to hold threaded fasteners in panels with open backs such as drywall and within the subsurface of blind holes.

2. Description of the Prior Art

Devices for anchoring a threaded bolt or other fastener in a borehole are well known in the art. Devices employing at least two interacting members actuated by the threaded or unthreaded fastener are exemplified by U.S. Pat. No. 927,064 issued in 1909 to Mower; U.S. Pat. No. 4,602,902 issued in 1986 to Herb; U.S. Pat. No. 3,524,379 issued in 1970 to Fischer; U.S. Pat. No. 3,248,998 issued in 1966 to Siegel; U.S. Pat. No. 3,941,028 issued in 1976 to Lobello; U.S. Pat. No. 4,690,597 issued in 1987 to Liebig; U.S. Pat. No. 4,416,048 issued in 1983 to Otte; U.S. Pat. No. 4,692,076 issued in 1987 to Herb; U.S. Pat. No. 3,175,455 issued in 1965 to Reddy; U.S. Pat. No. 4,921,381 issued in 1990 to Gschwend.

Anchoring devices in which the anchor portion which remains within the borehole is one piece and which reacts only with the inserted fastener for expansion are exemplified by U.S. Pat. No. 3,431,813 issued in 1969 to Johnson; U.S. Pat. No. 3,316,798 issued in 1967 to Johnson; U.S. Pat. No. 3,318,183 issued in 1967 to Fischer; U.S. Pat. No. 3,022,701 issued to Potruch.

These all teach the leading end that fits into the borehole being divided into at least two parts which are hingedly attached to the trailing or head portion. These parts are spread apart by an advancing screw or nail fastener. As the fastener advances, there is continuous resistance to its advance by the spreading action. Parts with an unthreaded bore resist screw advancement as the threads must be cut by the screw. U.S. Pat. No. 4,610,587 issued in 1986 to Wollar teaches the parts to be spread apart being hingedly attached to both the leading edge and the head with the bore being provided with a female thread. Production of such a part with an internal threaded bore is complex and expensive, and advancement of the screw fastener is resisted by the tapered bore.

SUMMARY OF THE INVENTION

It is accordingly an object of the invention to provide an inexpensive and simple to produce one piece device for holding a threaded fastener in a hole useful in a hollow panel such as gypsum wallboard or drywall in which the device expands behind the panel like a rivet or, in the case of partial penetration in a blind bore,embeds itself like an expansion anchor against the walls of the bore. It is another object that the device be provided with a prethreaded bore to permit an easy low resistance advancement of a threaded fastener therein during the initial penetration of the fastener prior to advancement to the spreading action, so that all of the resistance that must be overcome is work expended in the locking or securing of the device.

The device of the invention comprises a one piece molded or cast device having two substantially equal halves joined together by a thin, frangible hinge at what will become the leading edge when the two halves are folded together. Each half carries one half of a threaded bore divided axially. When folded together the two halves form a continuous threaded bore for easy accurate advancement of a threaded fastener therein. At the terminus of the threaded portion of the bore, the fastener encounters an unthreaded portion composed of the balance of the two halves. As these are forced apart by the advancing fastener, the frangible hinge breaks apart, and the spread apart halves either fold back behind the hollow panel or press against the sides of the blind hole.

These and other objects, advantages and features of the invention will become more apparent when the detailed description is studied in conjunction with the drawings in which like reference characters are used to designate like elements in the various drawing figures.

BRIEF DESCRIPTION OF THE DRAWINGS

FIG. 1 is a top view of the device of the invention.

FIG. 2 is a bottom view of the device.

FIG. 3 is a side view of the device.

FIG. 4 is an end view of the device.

FIG. 5 is a sectional view taken through line 5—5 of FIG. 3.

FIG. 6 is a sectional view taken through line 6—6 of FIG. 3.

FIG. 7 is an end view of the device after it has been folded.

FIG. 8 is a sectional view taken through line 8—8 of FIG. 7.

FIG. 9 is a side view of the folded device.

FIG. 10 is a perspective view of the device partially folded.

FIG. 11 is a sectional view, as in FIG. 8, of the device after anchoring in a drywall panel.

FIG. 12 is a top view of another embodiment of the invention in the form of an anchoring device for a blind hole.

FIG. 13 is a bottom view of the device of FIG. 12.

FIG. 14 is a side view of the device of FIG. 12.

FIG. 15 is a longitudinal sectional view of the device of FIG. 12 after it has been folded.

FIG. 16 is a sectional view of the folded device of FIG. 12 anchored in a blind hole.

DETAILED DESCRIPTION OF PREFERRED EMBODIMENTS

Referring now first to FIGS. 1–11, the anchoring device of the invention is formed of plastic or metal in one piece by well known economical manufacturing methods such as injection molding or die casting, and it is designed to readily release from an inexpensive mold or die by the arrangement of the parts. The monolithic body 2 has a planar surface 9 bounded by two free ends 5 and lateral sides 6. Each end 5 terminates in a half-circular disc 7. Two half-cylinder portions 12 of the body extend from the discs to a hinge portion 10 at the midpoint, and share a common axis 27 in the diametral plane 9. The half-cylinder portions 12 have a diameter less than the discs. The hinge portion 10 is less than a millimeter thick, and extends along axis 9 a distance less than its width.

It is designed to fold so that the two half cylinders join together at their diametral planes to form a complete cylinder. The hinge is designed to be frangible so that it will rupture when the lower portions 17 are forced apart. Perforations 24 may optionally be provided to facilitate rupture of the hinge.

Elongate half cylindrical threaded recesses 15 in the diametral planes 9 of each cylinder extend from the free end 5 to a body portion 17 intermediate the end and the hinge.

The two recesses are so arranged that when the body is folded at the hinge, the threads 16 will align and form a continuously threaded cylindrical passage 19 for receiving a threaded fastener 1 without substantial resistance. The two discs join to form a circular head 18 to engage the outer surface 26 of a support 30 such as the gypsum drywall shown in FIG. 11. As the fastener 1 advances beyond the recesses, the unthreaded, unrecessed portions 17 are forced apart, rupturing the hinge 10. The portions 17 are folded outward and engage the inner surface 28 of the support to securely anchor the device in the wall with a precisely threaded hole. Tapered pins 23 may optionally be provided to engage alignment holes 22 to further ensure correct alignment of the threads when folding (FIG. 10). There will be considerable resistance to fastener rotation when rupturing the hinge. Anti-rotation ribs 31 extend radially parallel to planar surface 9 and ribs 32 extend orthoganal to planar surface 9 so positioned that they will release easily from a simple mold or die in the manufacturing process. This is also true of the half cylindrical threads that can be formed without any rotating element in the mold or die for very economical manufacture.

Notches 34 (FIG. 10) may optionally be provided in discs 7 to hold the head from rotating with a spanner while installing the fastener.

Referring now to FIGS. 12–16 another embodiment of the invention is shown in use in a blind borehole 30. It differs from the device of FIGS. 1–11 in that the portions 17 are provided with threaded half-cylindrical recesses 33 that have a diameter less than the threaded recesses 16. This diameter may be the pitch diameter of the fastener 1 or less as required for a particular application.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. An anchoring device for retention of a threaded fastener for insertion within a borehole through a front surface provided in a support, the device comprising:

an elongate monolithic body having a planar surface with a long axial dimension between two ends and a short transverse dimension between two lateral sides;

each end terminating in a half-circular disc extending orthogonal to the planar surface, each disc bearing a diametral edge coextensive with the planar surface;

a thin frangible, foldable hinge portion positioned midway between the ends, extending between the sides and having an axial length less than the transverse dimension;

two elongate half-cylinder portions, each extending axially from the hinge portion to one of the discs, the planar surface defining the diameter of each half-cylinder portion, the diameter of the half-cylinder being less than the diameter of the disc;

two elongate half-cylindrical threaded recesses in the planar surface arranged coaxially with the half-cylinder portions and extending axially from one or the other of the discs, at an outer face thereof, to an unthreaded body portion before the hinge portion; and the device adapted to fold about the hinge portion so that the two discs are in contact forming a circular head, the two half-cylinder portions are in contact forming a cylindrical anchoring device for borehole insertion having a continuously threaded cylindrical passage for the threaded fastener, the hinge portion being adapted to rupture when the screw fastener is advanced beyond the threaded passage and the two unthreaded body portions are forced apart by the advancing screw fastener to thereby anchor the device in the support.

2. The device according to claim 1, in which the unthreaded body portions are provided with an unthreaded elongate half cylinder recess coaxial with the threaded recess and having a lesser diameter than the threaded recess.

3. The device according to claim 1 further comprising alignment means provided in the planar surface for ensuring alignment of the two half-cylinder portions to form the continuously threaded cylindrical portions.

4. The device according to claim 1, in which the continuously threaded passage is dimensioned to receive the threaded fastener without substantial resistance.

5. An anchoring device for retention of a threaded fastener in a support for insertion of the device in a borehole provided through the front surface of the support, the device comprising:

an elongate monolithic body comprising:

two half-cylinders aligned along a common axis, each half-cylinder having two ends, a free first end terminating in a half-circular disc having a diameter greater than the diameter of the half-cylinder and a second end joined to a short, foldable frangible hinge portion lying between the half-cylinders, the half-cylinders having diametral planes that are coplanar with the hinge portion;

a half-cylindrical threaded elongate recess coaxial with the half-cylinder and extending from the free end to an unthreaded portion of the half cylinder located intermediate the first and second ends; and the device adapted to fold about the hinge portion so that the two discs are in contact forming a circular head, the two half-cylinder portions are in contact forming a cylindrical anchoring device for borehole insertion having a continuously threaded cylindrical passage for the threaded fastener, the hinge portion being adapted to rupture when the screw fastener is advanced beyond the threaded passage and the two unthreaded portions are forced apart by the advancing screw fastener to thereby anchor the device in the support.

6. The device according to claim 5, in which the continuously threaded passage is dimensioned to receive the threaded fastener without substantial resistance.

7. An anchoring device for retention of a threaded fastener in a support for insertion of the device in a borehole provided through the front surface of the support, the device comprising:

an elongate monolithic body comprising:

two half-cylinders aligned along a common axis, each half-cylinder having two ends, a free first end terminating in a half-circular disc having a diameter greater than the diameter of the half-cylinder and a second end joined to a short, foldable frangible hinge portion lying between the half-cylinders, the half-cylinders having diametral planes that are coplanar with the hinge portion;

a half-cylindrical threaded elongate recess coaxial with the half-cylinder and extending from the free end to an unthreaded portion of the half cylinder located intermediate the first and second ends;

the device adapted to fold about the hinge portion so that the two discs are in contact forming a circular head, the two half-cylinder portions are in contact forming a cylindrical anchoring device for borehole insertion having a continuously threaded cylindrical passage for the threaded fastener, the hinge portion being adapted to rupture when the screw fastener is advanced beyond the threaded passage and the two unthreaded portions are forced apart by the advancing screw fastener to thereby anchor the device in the support; and the continuously threaded passage so formed being dimensioned to receive the threaded fastener without substantial resistance.

8. The device according to claim 7 further comprising alignment means provided in the planar surface for ensuring alignment of the two half-cylinder portions to form the continuously threaded cylindrical portions.

* * * * *